E4819 XR 3,201,522 [redacted] TWB SEARCH ROOM

INVENTOR
M. E. OZENBERGER
BY Donald M Duft
ATTORNEY 3,201,522

COMMON CONTROL SWITCHING SYSTEM FOR RADIO CIRCUITS

Milton E. Ozenberger, Summit, N.J., assignor to Bell Telephone Laboratories, Incorporated, New York, N.Y., a corporation of New York Filed Sept. 6, 1962, Ser. No. 221,720
19 Claims. (Cl. 179—27)

Figure 1:
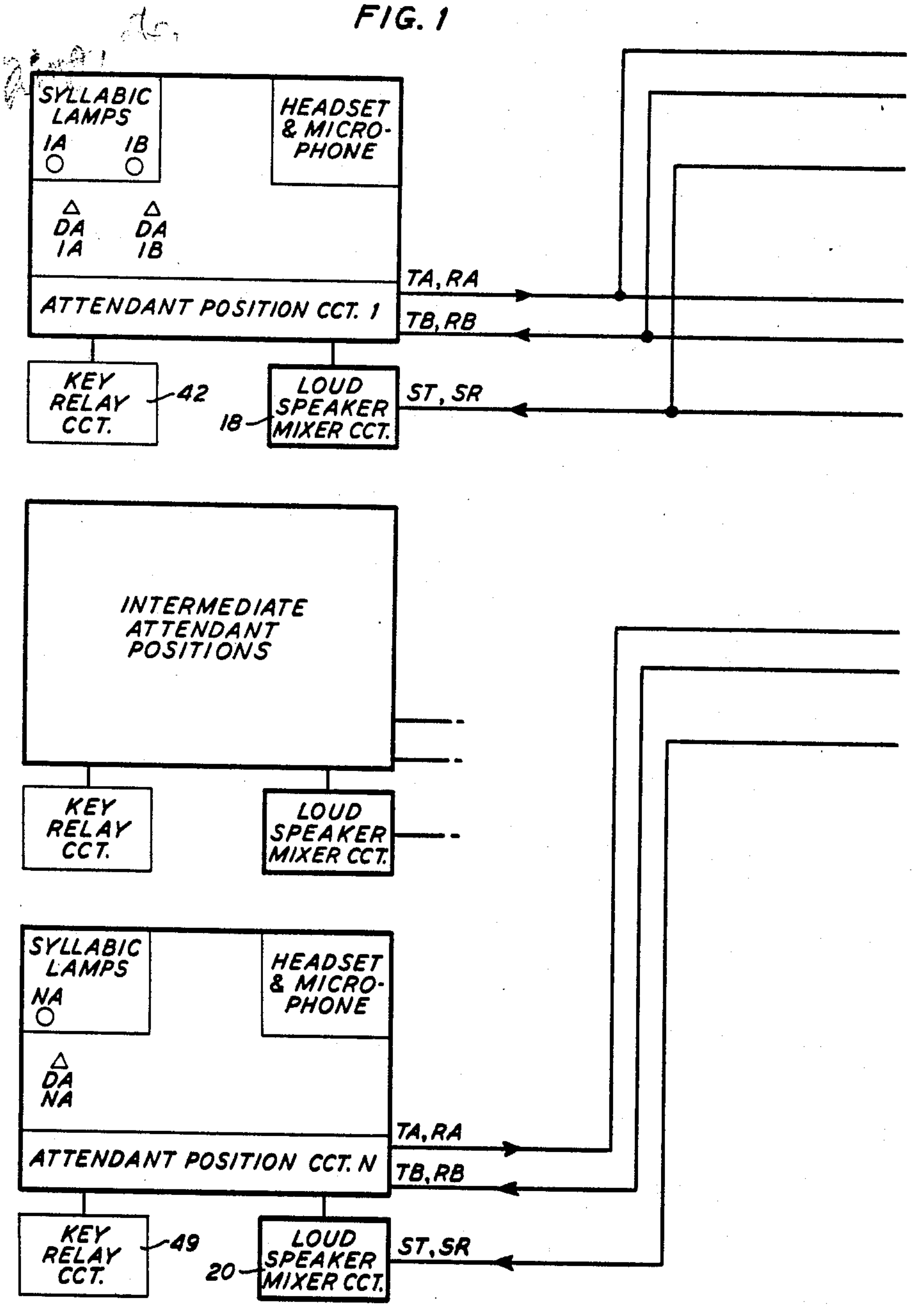

This invention relates to key type switching systems and particularly to key type switching systems for interconnecting radio circuits and attendant positions. More particularly, this invention relates to a key type switching system wherein a central supervisory position is provided to program and control the interconnection of attendant positions and arbitrarily selected groups of radio lines.

Key type switching systems are normally utilized where the associated stations require access to a relatively limited number of other stations or circuits. In such cases, establishing the connection by key selection offers the advantages of economy, convenience, flexibility, and speed.

Such systems are used to maximum advantage by organizations, such as governmental agencies, which have frequent occasions to supply or to interchange information with other agencies or individuals. An agency which might advantageously utilize the services of a key type switching system is the Federal Aviation Agency (FAA) which regulates and controls air traffic in the United States. In order to control this traffic, the FAA has established a number of strategically located flight control centers, each of which has responsibility for the aircraft in its area. Each flight control center is staffed by a plurality of controllers, one for each sector in the area for which the center is responsible. Each controller, in turn, is responsible for the aircraft within his sector which he controls from an attendant position provided with suitable communication equipment. The controller in the course of performing his function has occasion to make frequent contact with a number of ground stations, such as weather bureaus, airline dispatch centers, control towers, etc. The need for a key type switching system for use under such circumstances was met by the arrangement disclosed in T. E. Allen et al. application Serial Number 141,178, filed September 27, 1961. The Allen disclosure provides for key selection and dialing selection by attendant positions of individual circuits which terminate at various stations or at other attendant positions.

Although the Allen disclosure is a significant advancement in the art, the need still remains for a key controlled switching system wherein a plurality of circuits, such as radio lines, may be simultaneously seized and controlled by an attendant position. This need has developed because of the increased volume of air traffic in each sector which necessitates the use of additional radio line equipment to aid the controller to more efficiently perform his function. It has also been recognized that maximum flexibility should exist as to the particular radio lines over which an attendant position exercises control at a given time because of the constantly changing situations which are inherent where air traffic is involved.

Accordingly, it is an object of the invention to provide an improved switching system for facilitating the connection of individual attendant positions with a plurality of radio circuits.

Another object of the invention is to enable individual attendant positions to rapidly select a plurality of radio circuits.

Another object of the invention is to enable an attendant position to simultaneously control a plurality of radio circuits in an exceedingly simple manner.

Another object of the invention is to provide an improved switching system of sufficient flexibility to enable rapid changes in the association of attendant positions and particular radio circuits in response to a fluctuating traffic demand.

These and other objects are attained in accordance with an exemplary embodiment of the invention wherein a crossbar switch field for interconnecting attendant positions and radio circuits is provided in a key type switching system. Control of the crossbar switches is accomplished by pushbutton signaling from a central supervisory position.

The central position is provided with an attendant position selecting key for each plurality of radio lines which is to be made accessible to each attendant position. Upon the operation of a selecting key, common control equipment is alerted to respond to pushbutton signaling from the central position as will be described more completely hereinafter. The subsequently transmitted signals identify, by predetermined codes, the specific radio circuits which are to be associated with the selected attendant position. The corresponding crossbar switch crosspoints are operated thereby causing the establishment of connecting paths between common circuitry at the attendant position and the selected radio circuits.

The connecting paths each comprise a four wire circuit; two wires constitute a transmission channel and the remaining two wires constitute a receive channel. Upon the establishment of the connecting paths, the receive channels of the selected radio circuits are cut through via a common terminating circuit to a loudspeaker at the attendant position for monitoring by the attendant.

At this point the combination of selected radio circuits, though available for monitoring, has not been seized by the attendant position but merely prepared for subsequent seizure. Actual seizure of the combination is accomplished by the operation of a direct access (DA) key at an attendant position which thereby transfers the receive channels of all radio circuits in the associated combination from the attendant loudspeaker to the attendant headset. Simultaneous transmission on all channels is then possible merely by depressing the push-to-talk button at the position.

The crossbar switch field and attendant position equipment is arranged such that at the discretion of the supervisory position, one or more radio circuits may simultaneously be associated with several positions in combination with other radio circuits which remain individual to those positions. In conjunction with this arrangement, equipment is provided to prevent simultaneous transmission on a combination by two positions which have one or more radio circuits in common.

A syllabic lamp display is provided at the attendant position which operates in response to the presence of an audio signal on any receive channel in a given combination. Thus, a syllabic lamp per combination is provided so that when more than one combination is made available for monitoring in the position loudspeaker, a lighted lamp identifies the specific combination which requires seizure by the attendant.

A feature of my invention is that a switching system is provided with equipment which is responsive to signals from a central supervisory position for establishing combinations of radio circuits, wherein each combination is exclusively accessible to a particular subordinate attendant position.

Another feature of my invention is that a switching system is provided with equipment which is responsive to signals from a central supervisory position for interconnecting subordinate attendant positions and arbitrarily determined combinations of radio circuits wherein selected radio circuits are common to selected combinations.

Another feature of my invention is that each subordinate attendant position is provided with equipment which is responsive to a single discrete signal from that position for causing the simultaneous seizure of a plurality of radio circuits.

Another feature of my invention is that each subordinate attendant position is provided with equipment which is responsive to a single discrete signal from the position during transmission on a combination of radio circuits to lockout all other positions from transmitting on a combination of radio circuits having a radio circuit in common with the aforesaid combination.

Another feature of my invention is that a switching system is provided with equipment which is responsive to signals from a central supervisory position for adding radio circuits to a combination of radio circuits previously seized by a subordinate attendant position.

Another feature of my invention is that a switching system is provided with equipment which is responsive to a signal from a central supervisory position for causing the release of a combination of radio circuits previously made accessible to a subordinate attendant position.

Another feature of my invention is that visual display apparatus is provided at a subordinate attendant position to enable the attendant to ascertain which one of a plurality of combinations of radio circuits currently has an active radio circuit or active plurality of radio circuits.

Another feature of my invention is that a switching system is provided with equipment which is responsive to signals from a central supervisory position for establishing a combination of radio circuits, each comprising a transmit and receive channel, exclusively accessible to a subordinate attendant position, wherein the equipment is further responsive to signals for disabling the transmit channels on selected ones of said radio circuits.

Figure 2:
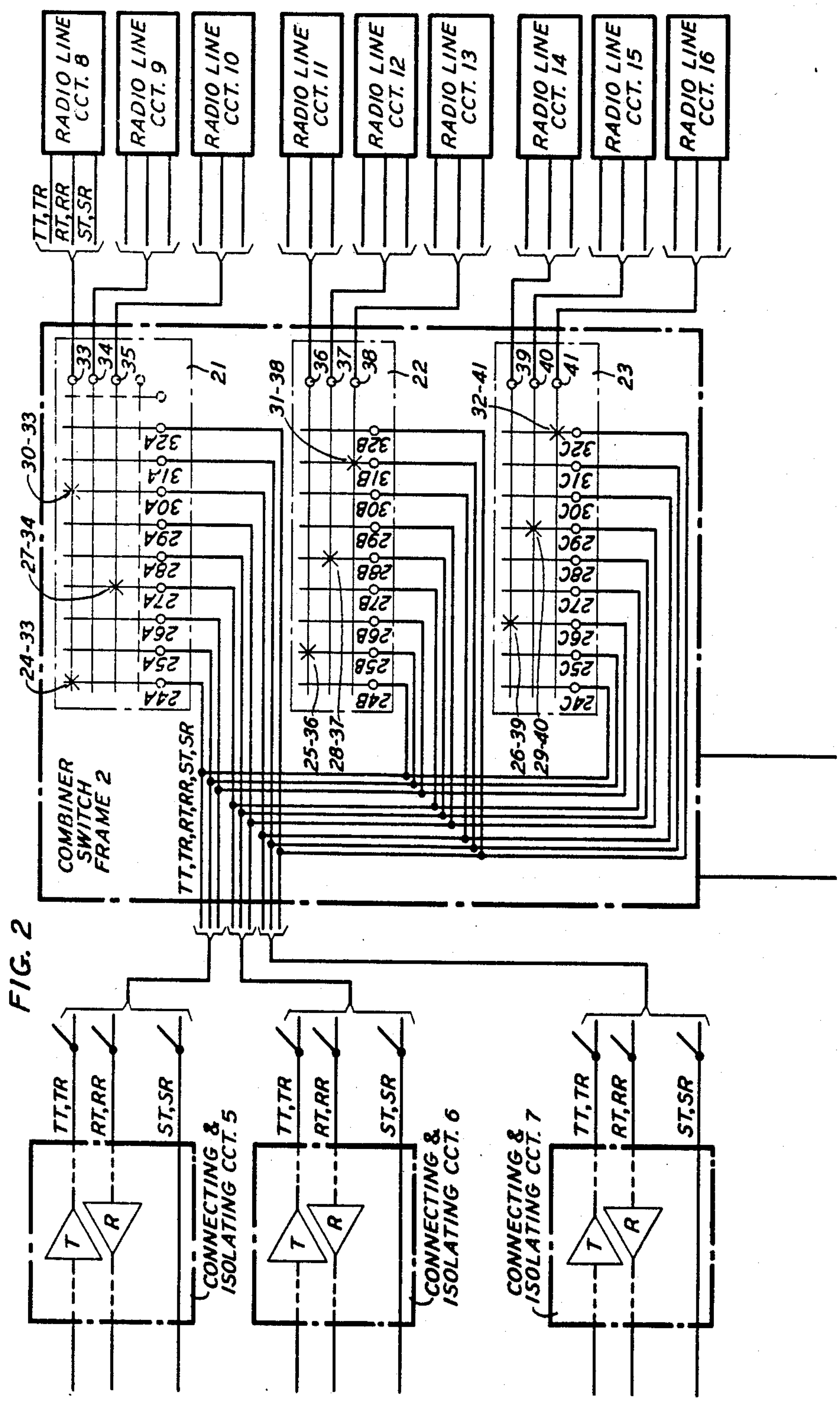
Figure 3:
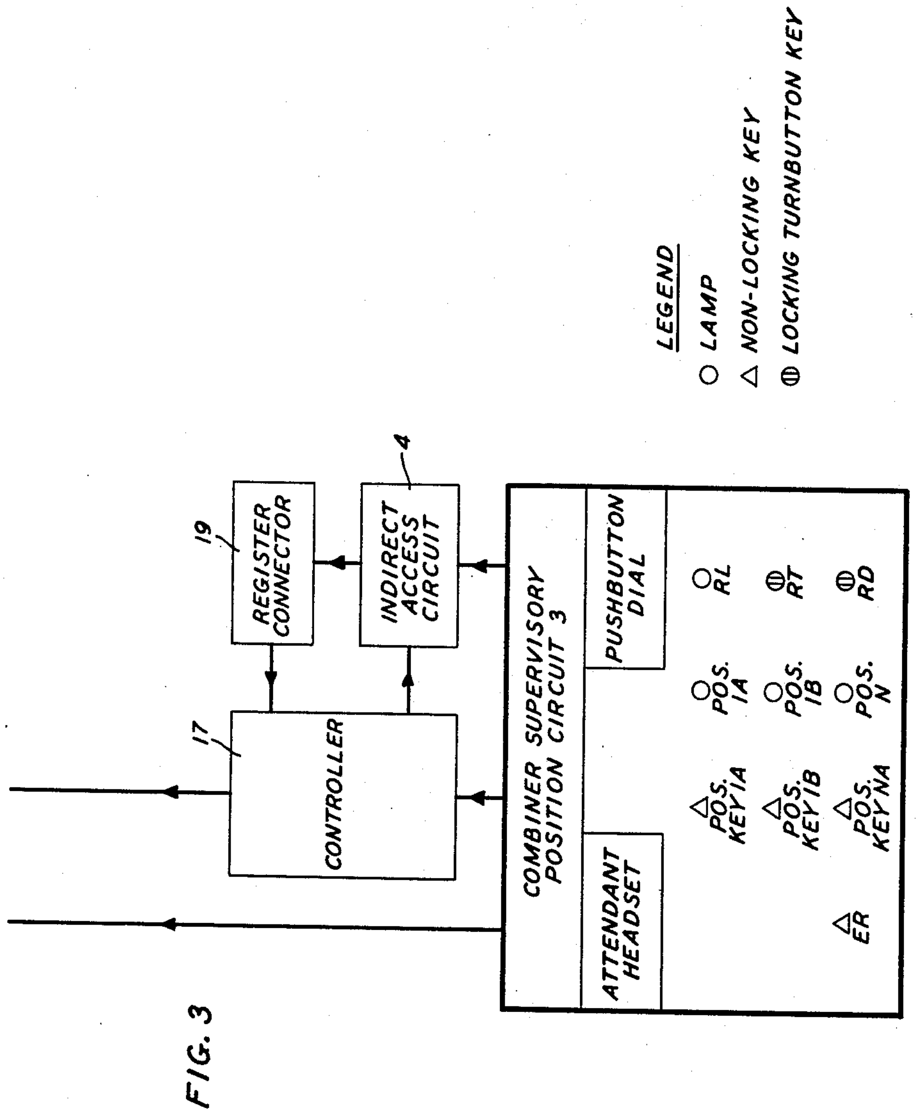
Figure 4:
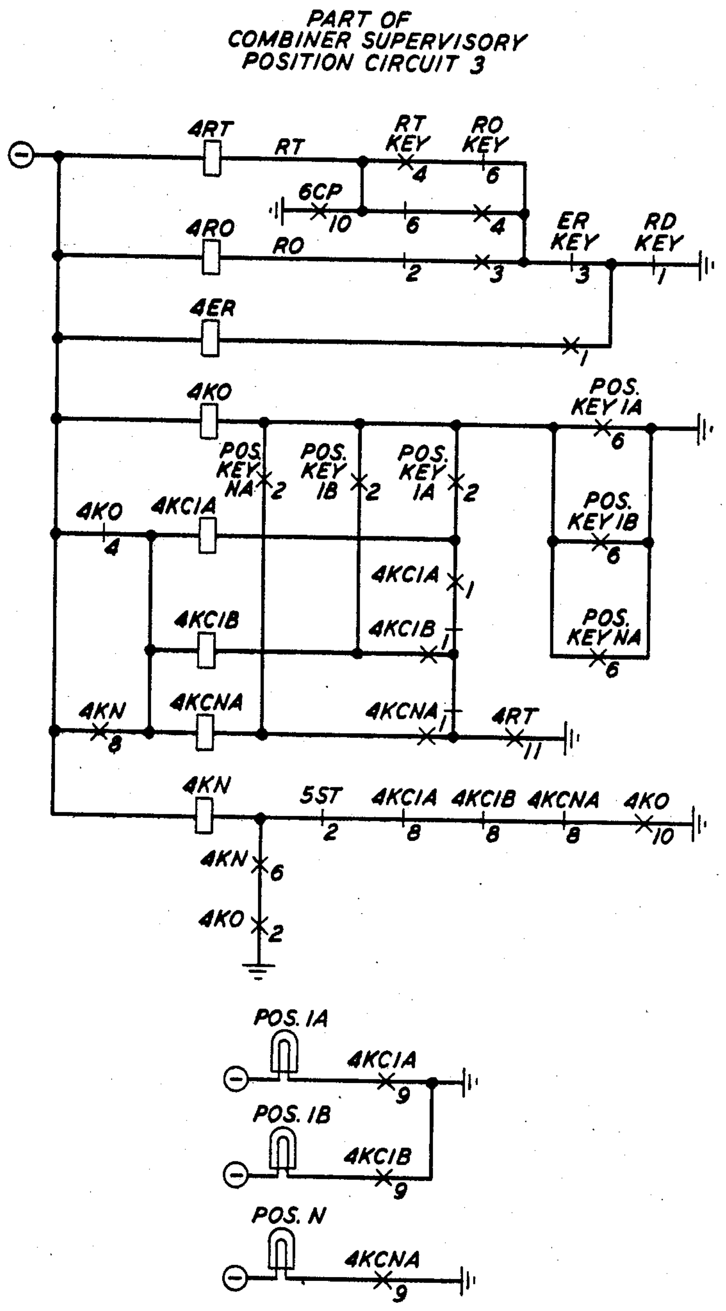
Figure 14:
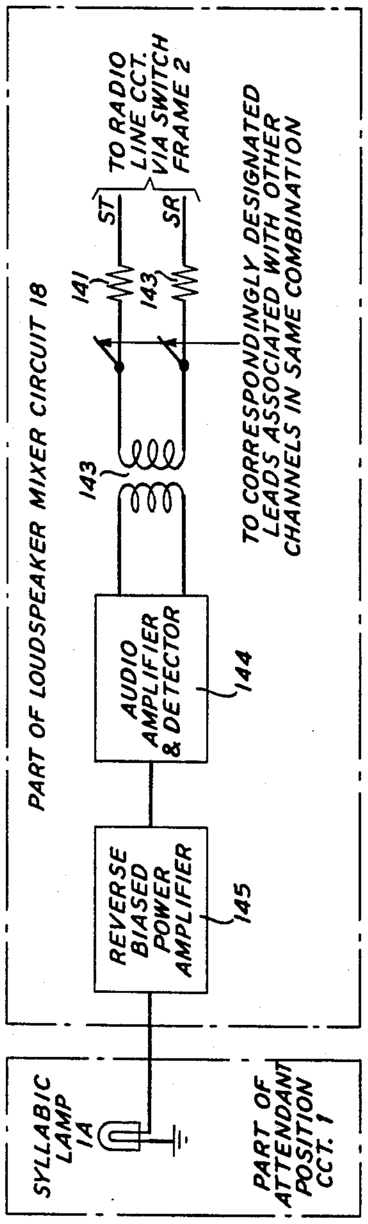
Figure 15:
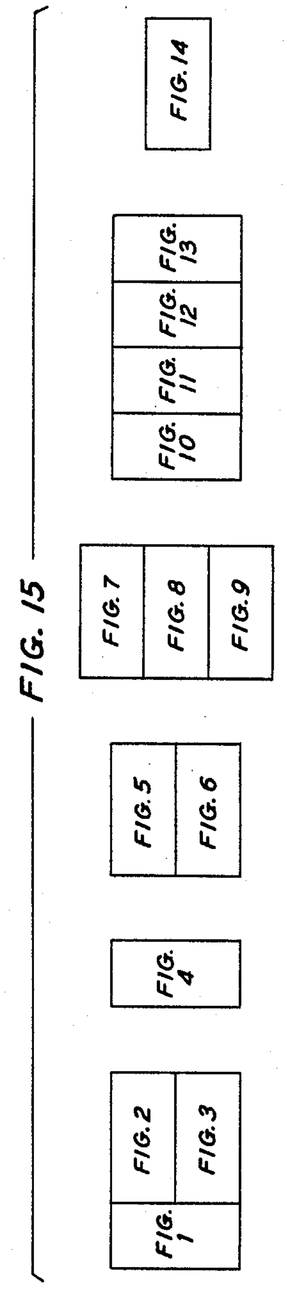

The foregoing and other objects, advantages and features of this invention will be more clearly understood by a reading of the following description of an exemplary embodiment thereof shown in the drawing, in which:

FIGS. 1, 2, and 3 show, in block diagram form, the interrelation of the components of the exemplary embodiment;

FIGS. 4, 5, 6, 7, 8, 9, 10, 11, 12, 13, and 14 show in greater detail the interrelation of the components of the exemplary embodiment; and FIG. 15 depicts the position in which the various figures should be placed.

It will be noted that FIGS. 4 through 13 employ a type of notation referred to as "detached-contact" in which an "X" represents a normally open contact of a relay and a bar shown intersecting a conductor at right angles represents a normally closed contact of a relay; "normally" referring to the unoperated condition of a relay. The principles of this type of notation are described in an article entitled "An Improved Detached-Contact-Type Schematic Circuit Drawing" by F. T. Meyer in the September 1955 publication of the American Institute of Electrical Engineers Transactions, Communications and Electronics, vol. 74, pages 505–513.

In order to facilitate an understanding of the invention, the description of the operation of the exemplary embodiment has been subdivided into a general descriptive portion designated 1.00 and a detailed descriptive portion designated 2.00. Section 1.00 and its subsections describe the invention in general terms with respect to FIGS. 1 through 3. Section 2.00 and its subsections describe the invention in detail with respect to FIGS. 4 through 14.

1.00 *General description* (*FIGS. 1, 2, 3*)

The equipment of the present invention may be advantageously incorporated in a key type system wherein common control circuits are employed to control the establishment of calls through a switching network. One such system is disclosed in T. E. Allen et al. application Serial Number 141,178, filed September 27, 1961. It is to be undertsood, however, that the present invention is not limited to use with a system of this type, but may be utilized with other types of switching systems.

Referring now to FIGS. 1, 2, 3, the invention cited herein is embodied in a common control key type switching system of the type disclosed in the Allen application. It is particularly concerned with apparatus in the combiner supervisory position circuit 3, combiner switchframe 2, attendant position circuits 1 through N, connecting and isolating circuits 5, 6, and 7, and radio line circuits 8 through 16, which are represented by the blocks shown in heavy lines in FIGS. 1 through 3. The other equipment units, namely controller 17, register connector 19, indirect access circuit 4, and key relay circuits 42 and 49 are neither shown nor described in detail herein except where necessary for a complete understanding of the invention. However, the Allen et al. application may be consulted where a complete understanding of the construction and operation of these units is desired.

An attendant position circuit 1 is shown connected via transmitting leads TA and RA and receiving leads TB and RB to associated connecting and isolating circuits 5 and 6. As will be described in more detail hereinafter, connecting and isolating circuits 5 and 6 comprise apparatus which permit a plurality of radio line circuits to be controlled by attendant position 1 via the aforementioned TA, RA, TB, and RB leads.

Combiner switchframe 2 is shown for purposes of illustration as comprising three crossbar switches numbered 21, 22, and 23. It will be obvious from the description of the detailed embodiment contained hereinafter that a combiner switchframe is not limited to this particular arrangement. But, rather, a large installation would probably include several such switchframes, each arranged with many crossbar switches.

Radio line circuits 8 through 16 are shown to have their respective transmit leads TT and TR, receive leads RT and RR, and loudspeaker connecting leads SR and ST terminated on the horizontal levels of the aforementioned crossbar switches. The correspondingly designated leads, which connect to the respective attendant positions via associated connecting and isolating circuits, are shown as being terminated on the vertical units of the aforementioned crossbar switches.

Attendant position circuit N is shown arranged similar to attendant position 1. It is obvious from an inspection of FIG. 1 that any radio line circuit may be connected to any connecting and isolating circuit by the closure of the appropriate crosspoints.

Combiner supervisory position circuit 3 is shown connected to combiner switchframe 2, controller 17 and indirect access circuit 4. Register connector 19 is shown connected to controller 17 and indirect access circuit 4.

While the following description will pertain only to the manner in which a supervisory position controls the accessibility of a plurality of radio lines to a plurality of attendant positions, it is to be understood that each attendant position may also be advantageously arranged to perform the functions disclosed in the Allen et al. application.

1.01. *Establishing a combination of radio lines for an attendant position*

Assuming initially that neither of the aforementioned attendant positions are connected to any radio line circuits, the supervisor at supervisory position 3 manually operates a position selecting key, such as position key 1A. Further, assuming that the radio line circuits, which are to be associated with attendant position 1 require that position 1 be given control of both the transmit and receive leads of each radio line circuit, the supervisory position RT key is operated.

At this time, controller 17 is seized and, upon ascertaining that indirect access circuit 4 is available, advises supervisory position 3 accordingly and releases from the connection. As described in detail in the Allen application for a conventional attendant position, combiner supervisory position circuit 3 is connected by indirect access circuit 4 to register connector 19. The RL lamp at supervisory position 3 lights at this time to indicate that pushbutton dialing may begin.

Each radio line circuit is assigned an arbitrary code which uniquely identifies the circuit. Thus, at this time the appropriate code is dialed from supervisory position 3 into register connector 19, which translates the code into equipment location information. As set forth in the Allen application, controller 17 is recalled and receives the equipment location in terms of the horizontal level (i.e., select magnet). Therefore, assuming that radio line circuit 8 is to be connected to attendant position 1 at this time, the controller would be informed that the select magnet, corresponding to level 33 on crossbar switch 21 of switchframe 2, should be operated.

Controller 4 thereupon energizes the proper select magnet as indicated by register connector 19, and operates the proper hold magnet under control of the previously operated position selection key 1A in the combiner supervisory position circuit. Since attendant position circuit 1 has three hold magnets capable of closing the crosspoints in order to associate connecting and isolating circuit 5 with horizontal level 33, a preference arrangement in the combiner supervisory position circuit gives preference to a preselected one of these hold magnets, such as the one associated with vertical unit 24 on switch 21 of switchframe 2 thereby closing crosspoint 24–33. Controller 17, register connector 19, and indirect access circuit 4 thereupon release.

At this point radio line circuit 8 is connected via level 33 and vertical unit 24 of switch 21 on switchframe 2 to connecting and isolating circuit 5 of attendant position 1. The corresponding TT, TR and RT, RR leads are not continuous at this time with the associated TA, RA and TB, RB leads to attendant position 1. However, leads SR and ST are completed to loudspeaker mixer circuit 18 and thereby permit the attendant to monitor the receive channel of the connected radio line.

By reoperating position selecting key 1A, additional radio lines may be associated with connecting and isolating circuit 5 and loudspeaker mixer circuit 18 as described above for radio line 8. When the attendant at position 1 ascertains that he must assume control of the established combination, the corresponding DA–1A key is operated at position 1. As will be described more fully hereinafter, the established combination of radio lines is seized, and the receive channels are connected via connecting and isolating circuit 5 to the attendant headset and are no longer audible at the loudspeaker. Via connecting and isolating circuit 5, the transmit TT and TR leads of all radio lines present in the combination are connected to the TA and RA leads of attendant position circuit 1 where they are under control of a push-to-talk button of the attendant's microphone.

1.02. *Establishing a combination of radio lines for attendant position N*

Circuit action in establishing a combination of radio lines for attendant position N would proceed as described above for attendant position 1.

The particular radio lines which are associated with attendant position N is completely at the discretion of the supervisory position. Radio lines may be selected which do not appear in the combination provided for attendant position 1. However, it should be noted at this point that, since both exemplary attendant positions have access to all radio lines which appear on the horizontal levels of a particular crossbar switch, the supervisory position may arbitrarily select a radio line (or radio lines) for position N which has previously been selected for position 1. As will be described more fully hereinafter arrangements have been made to prevent simultaneous transmission by attendant positions on combinations which have a radio line in common.

1.03. *Syllabic lamp feature*

A syllabic lamp per combination is shown at each attendant position. Each lamp is arranged to respond to the presence of an audio signal on any radio line in a given combination. Thus, an attendant who is monitoring two or more distinct combinations of radio lines in his loudspeaker is enabled to ascertain which combination contains an active radio line requiring action on the attendant's part. The attendant thereupon operates the corresponding DA-key to seize the appropriate combination.

Thus, in addition to the combination established by the operation of position selecting key 1A for position 1, the supervisory position may via position selecting key 1B establish an additional combination of radio lines for position 1. The added combination would thereupon be accessible to that position via connecting and isolating circuit 6 which is controlled by key DA–1B in the same manner as described for key DA–1A associated with connecting and isolating circuit 5.

1.04. *Modification of established combinations*

As will be described more fully hereinafter, supervisory position circuit 3 may release an existing combination of radio lines, or may add additional radio lines to an existing combination by pushbutton control from the supervisory position.

Release of a combination is accomplished by causing the ER key and an appropriate position selecting key to be simultaneously operated, thereby opening the operating hold paths of associated hold magnets.

2.00. *Detailed description*

In order to reduce leads between figures and thereby facilitate an understanding of the exemplary embodiment, each group of figures (see FIG. 15) shows the circuit arrangement of the apparatus required to perform related circuit functions. Thus, for example, FIG. 4 portrays the apparatus in the combiner supervisory circuit which is required for the selection of the attendant position prior to establishing a combination of radio lines to be accessible thereto. As a further aid to understanding the invention, each subdivision of the Detailed Description has the appropriate figure number (or numbers) listed in parenthesis after the subdivision title. Also, on the drawing, the first digit of each relay designation has been assigned so as to identify the figure number on which the operate path for that relay is shown.

As noted earlier, the circuit operation of controller 17, register connector 19, indirect access circuit 4, and key relay circuits 42 and 49 will be discussed herein only insofar as necessary for a clear understanding of the invention. A more complete understanding of the detailed circuit operation may be obtained by consulting the Allen et al. application.

2.01. *Attendant position selection (FIGS. 1 through 4)*

It will be noted by reference to FIG. 3 that for purposes of illustration, supervisory position 3 is equipped with three nonlocking position selection keys designated 1A, 1B, NA. Key NA is depressed to select a combination of radio lines by pushbutton dialing for attendant position N. Key 1A and 1B are provided to permit the selection of two distinct combinations for attendant position 1. It is, of course, obvious that where a larger number of attendant positions are involved, a proportionately greater number of appropriately designated keys would be provided at supervisory position 3.

We shall assume that a combination of radio lines is to be made accessible to attendant position 1 under control of supervisory position 3. We shall further assume that the attendant at position 1 is to be given control of the transmit and receive pairs of all radio circuits within the combination.

At supervisory position 3, locking key RT is operated thereby completing the operate path of relay 4RT via operated make contact 4 of the RT key and the released break contacts on keys RO, ER, and RD to ground.

The nonlocking position key 1A is depressed and operates relay 4KO via operated make contact 6 on position key 1A to ground.

As a check that no 4KC-relays (i.e., 4KC1A, 4KC1B or 4KCNA) are operated, break contact 4 on relay 4KO removes battery from the windings of all 4KC-relays. Operated make contact 10 of relay 4KO completes the operate path of relay 4KN through released break contacts 2 of relay 5ST, 8 of relay 4KC1A, 8 of relay 4KC1B, and 8 of relay 4KCNA as a check of the released condition of the 4KC-relays. The operation of relay 4KN recloses battery to the 4KC-relay windings via operated make contact 8 of relay 4KN. Relay 4KC1A operates at this time from the battery provided through operated make contact 8 of relay 4KN, the winding of 4KC1A, and operated make contacts 2 and 6 of position key 1A to ground. Relay 4KC1A thereupon locks to ground via operated make contact 1 of relay 4KC1A, released break contacts 1 of relay 4KC1B, 1 of relay 4KCNA, and operated make contact 11 of relay 4RT.

At this time the position 1A lamp lights at supervisory position 3 via operated make contact 9 of relay 4KC1A to indicate that the "A" combination for attendant position 1 is to be selected.

2.02. *Establishing the pushbutton dialing connection from supervisory position 3 (FIGS. 5, 6)*

Upon the lighting of the position lamp 1A as set forth in paragraph 2.01, it is necessary that equipment be connected to supervisory position 3 capable of receiving and translating the dialed code which identifies the first radio line circuit in the combination to be provided to attendant position 1.

The combiner supervisory circuit may advantageously be arranged to function in a manner similar to that described for a regular attendant position making an indirect access call as set forth in detail in the Allen et al. disclosure. Briefly, the circuit is arranged to bid for and seize a register connector circuit which has apparatus for storing the dialed code and apparatus for translating the dialed code into equipment location information, i.e., select magnet corresponding to the horizontal level appearance of the radio line circuit on switch frame 2. This information, in turn, is forwarded to the controller which, under control of combiner supervisory position circuit 3, provides for closure of the appropriate crosspoints.

Relay 5ST is operated via battery provided through released break contact 10 of the 4KO relay, released break contacts 8 of relays 4KCNA and 4KC1B, operated make contact 8 of relay 4KC1A, and operated make contact 10 of relay 4RT through the winding of 5ST to ground.

As set forth earlier, each attendant position is provided with a connecting and isolating circuit for each combination of radio lines which may be made accessible to that position. Further, for purposes of explanation, each connecting and isolating circuit is shown as being capable of terminating three radio line circuits. Thus, each connecting and isolating circuit has three vertical unit appearances on a crossbar switch. Each vertical unit is chained vertically to corresponding verticals down the frame, thereby providing access to 30 radio line circuits for each vertical chain (i.e. 10 per switch).

As will be described more fully hereinafter, each vertical chain is provided with a 7SR-relay (i.e. 7SRA, 7SRB, 7SRC), which operates after the selection of the attendant position to indicate that all hold magnets in the associated vertical chain are idle.

Ground is provided through operated make contacts 10 of relays 7SR-, through operated make contact 2 of 4KC1A, released break contact 7 of relay 4KO, and operated make contact 12 of relay 4RT to operate relay 5IA. The operation of relay 5IA indicates that supervisory position circuit 3 is now ready to begin pushbutton dialing of a radio line circuit which is to appear in a combination accessible to attendant position 1.

As set forth in detail in FIG. 21 of the Allen et al. application, indirect access circuit 4 comprises an S relay, the operated condition of which indicates availability of that circuit. Thus, assuming indirect access circuit 4 is idle, ground is provided through operated make contact 1 of relay S, operated make contact 8 of relay 5IA, and thence over lead STA via operated make contact 6 of 5ST and released break contact 6 of 5SD, and over lead STB via operated make contact 8 of 5ST and released break contact 8 of 5SD to bid for controller 17.

As described in the Allen et al. disclosure, upon seizure of controller 17, battery is returned on the CP lead, thereby operating relay 6CP. Operated make contact 1 of 6CP bids for seizure of idle indirect access circuit 4 by closing the GT and GO leads to that circuit. Relay G operates at this time via operated make contact 9 of relay S, operated make contact 1 of 6CP, through a chain of normal PC relays to ground on operated make contact 12 of relay 5IA.

The availability of register connector circuit 19 is indicated by the operation of relay PC19 which operates through operated make contact 2 of relay G, over the PC lead to operated make contact 11 of 5IA, operated make contact 2 of 6CP, and through released break contact 5 of 6CT to ground.

The earlier-referred to operation of relay 6CP operates relay 5SD by an obvious circuit. Operated break contact 6 and 8 of 5SD open the STA and STB leads to controller 17 to remove a request for that circuit at this time.

As shown in detail in FIG. 23 of the Allen et al. application, upon seizure of idle register connector circuit 19, ground from contact 4 of relay NCA is provided over the KR lead through operated make contact 4 of relay PC19 to light the RL lamp at supervisory position circuit 3. Thus, the supervisory position is alerted that receiving means are connected and that pushbutton dialing may begin.

In a similar manner, ground is returned from register connector circuit 19 via released break contact 10 of ST, operated make contact 2 of PC19 in indirect access circuit 4 and thence over the RL lead to operate relay 6CT via operated make contact 10 of 5IA, operated make contact 10 of 5ST, and operated make contact 12 of 5SD to the 6CT winding. Relay 6CT thereupon locks operated through operated make contact 12 of 5SD, operated make contact 10 of 6CT, and operated make contact 4 of 6CT to ground.

The operation of relay 6CT grounds the HM lead to controller circuit 17 to cause the release of that circuit. As a result, relay 6CP releases; however, relay 5SD remains operated at this time by an obvious holding path comprised of operated make contacts on relays 6CT, 5ST, and 5SD to ground.

When, as described above, the RL lamp lights at supervisory position 3, the pushbutton set is operated to transmit the code assigned to the radio line circuit. As set forth in the Allen et al. application, the code is forwarded via the 0, 1, 2, 4, and 7 leads through the operated make contacts of the PC relay to register connector 19, where it is translated into the horizontal level location of the radio line circuit on switchframe 2.

At the completion of the translation function, relay ST operates in register connector 19 thereby providing a ground through operated make contact 12 to shunt release relay 5SD. The release of 5SD recloses the STA and STB leads to reseize controller 17, and also releases relay 6CT in supervisory position circuit 3.

2.03. *Operation of select and hold magnets (FIGS. 7, 8, 9)*

As shown in detail on FIG. 22 of the Allen et al. application, the output of register connector 19 comprises a grounded *c*— lead which uniquely identifies the transmitted code. This *c*— lead is closed through operated make contacts on the previously operated RD relay to operate the select magnet for the horizontal level on which the radio line circuit appears on switchframe 2. Thus, operated make contact 4 of relay RD completes the operate path of select magnet 7SM33 corresponding to radio line circuit 8 which we shall assume is identified by the transmitted code. It is of course obvious that a *c*— lead corresponding to each radio line circuit is provided and connected through additional make contacts of the RD relay to the appropriate select magnets on switchframe 2.

Each crossbar switch on switchframe 2 is provided with a steering relay 7SO—which operates in response to an energized select magnet on that switch. Therefore 7SO21 operates at this time via ground provided from make contact 2 of 7SM33.

Figure 5:
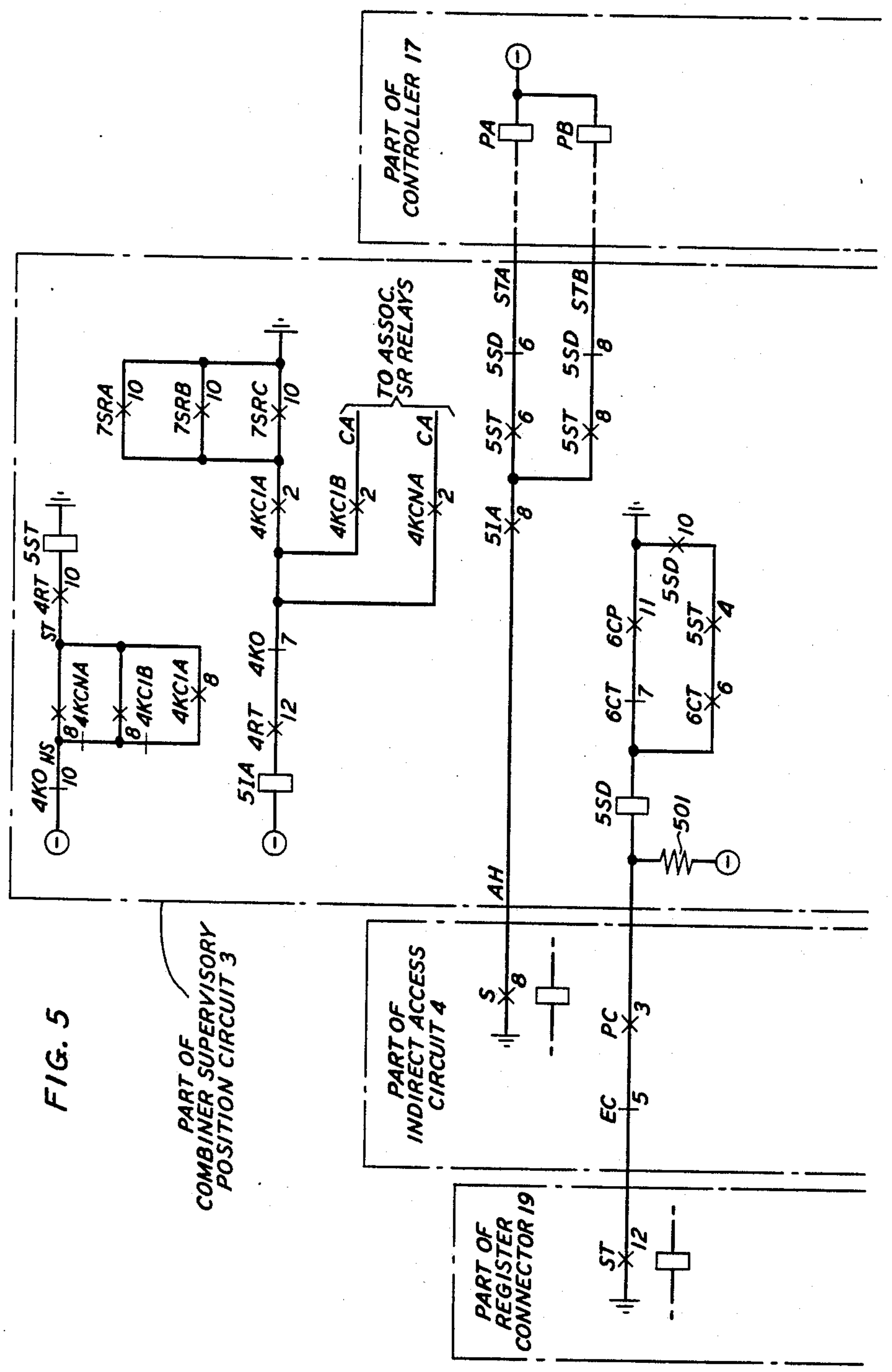
Figure 6:
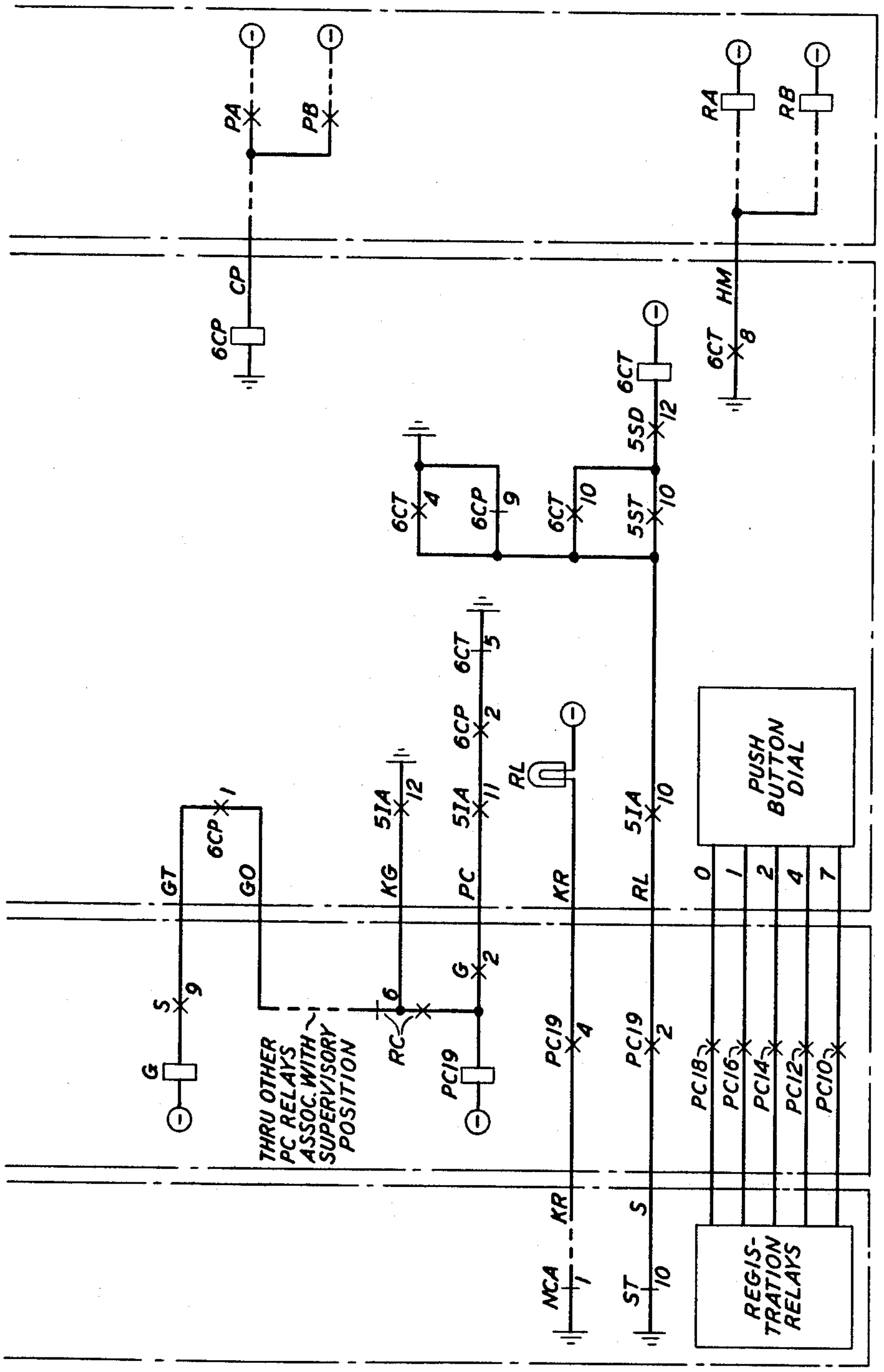
Figure 7:
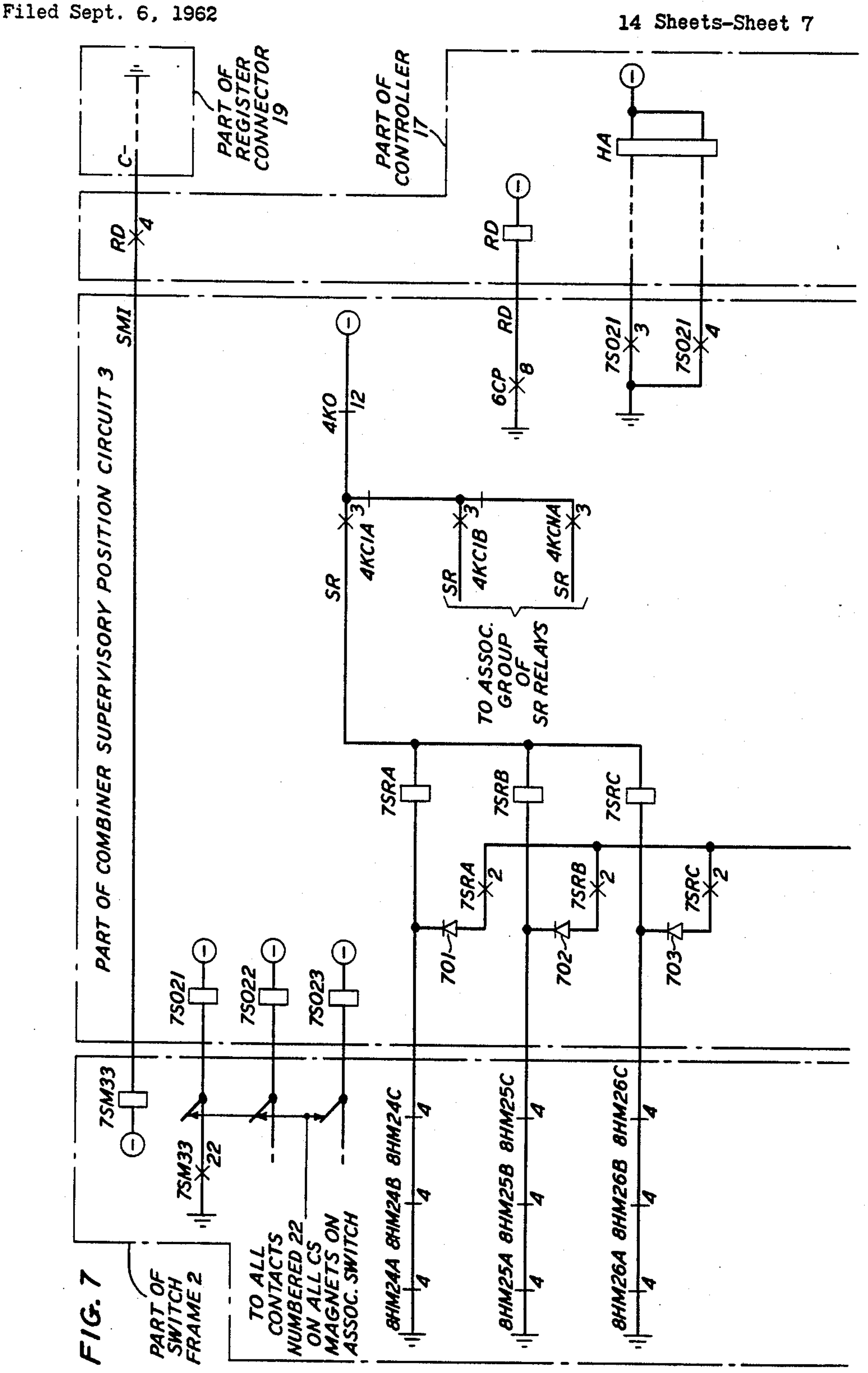

As set forth in FIGS. 5, 6, and 7, of the Allen et al. application, the operation of relay 7SO21 completes the operate path of relay HA in controller 17 by an obvious circuit.

The operation of relay HA provides ground through contact 2 of that relay from controller 17 over the HM lead to combiner supervisory position circuit 3. This ground is extended through normal break contact 9 of relay 6CT, and operated make contacts 12 of 6CP and 6 of the 4KC1A relay, where it is applied to a chain of transfer contacts on relays 7SRA, 7SRB, and 7SRC. As noted earlier, each hold magnet appearance on a crossbar switch on switchframe 2 is chained to corresponding verticals on other crossbar switches. A 7SR-relay is provided to control each such vertical chain. An inspection of the operate paths of relays 7SRA, 7SRB, and 7SRC will reveal that battery is applied through 4KO relay break contact 12 and 4KC1A make contact 3 to operate each 7SR-relay which is associated with a released chain of hold magnets. Thus at this time relays 7SRA, 7SRB, and 7SRC are operated.

The ground on lead HM is therefore extended via 7SRA make contact 1 and 7SO21 make contact 1 to operate hold magnet 8HM24A which locks operated through make contact 3 of 8HM24A, make contact 5 of 4KC1A, and break contact 2 of the 4ER relay.

Referring now to FIGS. 1, 2, and 3, it will be recognized that the TT, TR, RT, RR, SR, and ST of radio line circuit 8 have been closed through via operated crosspoints 24–33 to the correspondingly designated leads of connecting and isolating circuit 5 by the operation of the crosspoints associated with select magnet 7SM33 and hold magnet 8HM24A.

2.04. *Adding additional radio line circuits to the combination (FIGS. 4, 5)*

In order to add an additional radio line circuit in combination with radio line circuit 8 for attendant position 1, the nonlocking position selecting key 1A is reoperated at supervisory position 3. Relay 4KO thereupon reoperates as described in paragraph 2.01. The operation of the 4KO relay restores the supervisory position circuit to normal by releasing relay 4KC1A via 4KO break contact 4 and by releasing relay 5ST via 4KO break contact 10.

Circuit action then proceeds exactly as hereinbefore described in order to add an additional radio line circuit in combination with radio line circuit 8 to attendant position 1. Position selecting key 1A may thereupon be reoperated to add a third radio line.

Upon the establishment of this combination, position selecting key 1B may be activated in a similar manner to provide three additional radio line circuits in a separate combination for attendant position 1 accessible to that position by operation of key DA–1B.

Position selecting key NA may then also be utilized to establish a combination of any three radio lines for attendant position N.

Since the manner in which the various combinations are established is identical in each case as hereinbefore described, in order to avoid needless repetition and to facilitate a clear understanding of the invention, we shall assume that combinations of radio lines have been established for the attendant positions as set forth in the following table:

| Att'dt Position | Att'dt Pos. Comb. DA Key | Assoc. Conn. and Isolating Circuit | Radio Line Circuits | Associated Cross-points |
|---|---|---|---|---|
| 1 | DA-1A | 5 | 8 | 24-33 |
| | | 5 | 11 | 25-36 |
| | | 5 | 14 | 26-39 |
| | DA-1B | 6 | 10 | 27-34 |
| | | 6 | 12 | 28-37 |
| | | 6 | 15 | 29-40 |
| N | DA-NA | 7 | 8 | 30-33 |
| | | 7 | 13 | 31-38 |
| | | 7 | 16 | 32-41 |

As the above table indicates, attendant position 1 has two combinations of radio lines made accessible to it via connecting and isolating circuits 5 and 6, and attendant position N has one combination made accessible via connecting and isolating circuit 7.

At this time, the only radio line circuit conductors which are completed to the attendant position circuits, are the loudspeaker leads SR, ST. As will be described in more detail hereinafter, the receive channels of all radio line circuits are multiplied via the SR and ST leads to the position loudspeaker mixer circuit to permit monitoring by the attendant. The manner in which the attendant position seizes the radio line combinations will be described in the following sections.

2.05. *Seizure of combination established by supervisory positions 3 (FIGS. 1, 2, 3, 10, 11, 12, 13)*

The manner in which a combination is seized is identical for each attendant position, therefore FIGS. 10 through 13 show the detailed circuitry only for attendant position circuit 1 in conjunction with connecting and isolating circuit 5, key relay circuit 42, loudspeaker mixer circuit 18, supervisory position circuit 3, combiner switchframe 2 and radio line circuit 8. The following circuit description will describe the seizure of the combination established at supervisory position 3 after the operation of position key 1A. This combination which comprises radio line circuits 8, 11 and 14 is accessible for seizure by attendant position 1 upon the operating of nonlocking key DA–1A.

An occupied attendant position 1 is manifested by the insertion of plugs 105 and 106 into jacks 103 and 104, respectively, at the attendant position. Relay 10TJ thereupon operates through make contact 2 of jack 104 and over lead J to ground on break contact 8 of relay CP in key relay circuit 42.

In order to seize the combination of radio lines associated with key DA–1A, key DA–1A is operated momentarily. Ground is transmitted from break contact 8 of relay CP in key relay circuit 42 over the J lead, through operated make contact 11 on relay 10TJ in attendant position circuit 1, break contact 2 of the RLS key, and then through operated make contact 2 of key DA–1A to the KO lead to key relay circuit 42, and also through operated make contact 1 of key DA–1A to the K lead to key relay circuit 42. Relay KO operates and subsequently releases as described in the Allen et al. application for FIG. 8 of that disclosure. The grounded K1A lead causes relay K1A to operate and lock as described for relay K1 of FIG. 9 in the Allen et al. application.

The circuit action which succeeds the successful operation of K1A and release of KO differs at this point from the Allen et al. disclosure in that ground is returned over the CO lead to loudspeaker mixer circuit 18 from released break contact 2 of KO, operated make contact 2 of K1A, to operate relay 12FC1A.

As discussed hereinbefore, upon the establishment of the combination at supervisory position 3, the ST and SR leads associated with the receive channels of each radio line circuit are completed to the attendant position loudspeaker to permit monitoring by the attendant. This loudspeaker path for radio line circuit 8 comprises the T2 and R2 conductors connected to radio receiver 43 which extend through break contacts on relay 13C1 to the primary of transformer 134 in radio line circuit 8. The ST and SR leads connected to the secondary of transformer 134 are completed through operated crosspoint contacts 4 and 5 of crosspoint 24–33 on switchframe 2 to loudspeaker mixer circuit 18 where the leads are connected through capacitors 121 and 122, transfer contacts 2 and 8 of relay 12FC1A and resistors 123 and 124 to the primary of transformer 125. ST and SR leads associated with other radio line circuits in the same combination are multiplied to the primary winding of transformer 125 through the same transfer contacts on relay 12FC1A. The secondary winding of transformer 125 is connected to loudspeaker 45 in attendant position circuit 1.

The operation of relay 12FC1A enables transfer contacts 2 and 8 and opens leads ST and SR toward the primary winding of transfermer 125 in loudspeaker mixer circuit 18 and also places a shunt across these leads at the point of multipling with other radio lines, thus disabling the loudspeaker for those radio channels associated with this combination.

Relay 10D in attendant position 1 operates from ground provided through operated make contact 10 of 12FC1A in loudspeaker mixer circuit 18. Operated make contact 4 of 12FC1A grounds the CC lead to connecting and isolating circuit 5 to operate relay 12CC.

The operation of relay 10D completes the obvious operate path of relay 10LS in attendant position circuit 1. Relay 11S, in connecting and isolating circuit 5, then operates from battery provided through ballast lamp 101, operated make contact 11 of relay 10LS over the RO lead from attendant position circuit 1, through the winding of relay 11S, over the SV lead to ground on operated make contact 10 of the 12FC1A relay in loudspeaker mixer circuit 18.

At this time microphone 48 at attendant position 1 is connected through plugs 105 and 106, contact 3 of jack 103, contact 5 of jack 104, and capacitors 107 and 108 to the primary winding of induction coil 102.

The transmit leads TA and RA are continuous from the secondary winding of induction coil 102 in attendant position circuit 1 to connecting and isolating circuit 5 through operated make contacts 7 and 3 of relay 11S to the input of amplifier TR. The output of amplifier TR, which is of well-known configuration, is multiplied to correspondingly designated leads associated with all radio channels in the combination; thus, for radio line circuit 8, the output of amplifier TR is connected through resistors 111 and 112 and released break contacts 1 and 2 of the 11TL0 relay to the primary winding of repeat coil 118. The secondary winding of the repeat coil 118 is completed through operated make contacts 3 and 4 of relay 12CC, over the TT and TR leads to supervisory position circuit 3, through released break contacts 2 and 3 of relay 9TEA, through operated crosspoint contacts 0 and 1 of crosspoint 24–33 on combiner switchframe 2 to the primary winding of transformer 131 in radio line circuit 8. It is to be noted that the secondary winding of transformer 131 is not closed through to radio transmitter 44 at this time because of the released condition of make contacts 9 and 11 of relay 13A1.

In a similar manner, the primary winding of transformer 133 is not continuous to radio receiver 43 because of the released condition of make contacts 2 and 4 of relay 13A1. However, the secondary winding of transformer R is completed through amplifier 46 of well-known configuration to the primary winding of transformer 132. The secondary winding of transformer 132 is connected over receive leads RT and RR to switchframe 2 where the leads are continuous through operated crosspoint contacts 2 and 3 of crosspoint 24–33 to connecting and isolating circuit 5. Operated make contacts 1 and 2 of relay 12CC extend the RT and RR leads through capacitors 115 and 116, make contacts 4 and 8 of relay 11 LC1, resistances BU and BV to the input of amplifier RC. The input of amplifier RC, which is of well-known configuration, is multipled to correspondingly designated leads associate with other radio channels in the same combination. The output of amplifier RC is connected through operated make contacts 5 and 9 of relay 11S to the TB and RB leads of attendant position circuit 1 where they are completed through released break contacts 4 and 5 of relay 10TC, contact 1 of jack 103, contact 1 of jack 104, and via plugs 105 and 106 to the headset receiver 47.

Relay 11GS operates at this time from battery through the 11GS relay winding, through operated make contact 1 of relay 11S, over the GS lead through normal break contact 6 on relay KO, through released RLS key break contact 2 and operated make contact 11 of relay 10TJ in attendant position circuit 1, and via lead J to ground through released break contact 8 on relay CP in key relay circuit 42.

Operated make contact 1 of relay 11GS provides ground through the winding of relay 11B1 to the center tap on induction coil 117 and from this point the ground is applied in simplex over the RT and RR leads to the center tap on the secondary winding of transformer 132 in radio line circuit 8 and then through the winding of relay 13A1 to negative battery. Relays 11B1 and 13A1 thereupon operate. Operated make contacts 2 and 4 of relay 13A1 connect the primary winding of transformer 133 in radio line circuit 8 to radio receiver 43.

Operated make contact 1 of relay 11B1 causes the operation of relay 11LC1 in connecting and isolating circuit 5 by an obvious circuit. Operated transfer contacts 4 and 8 of relay 11LC1 remove the 119 resistor shunt from leads RT and RR and connect these leads through to the input of amplifier RC thereby completing the receive path from radio receiver 43 through to headset receiver 47 at attendant position circuit 1.

Thus, while the above description refers specifically to radio receiver 43 which is associated with radio line circuit 8, it is obvious that 11B- relays (i.e. 11B1, 11B2, and 11B3) and 13A- relays (i.e. 13A1, 13A2, and 13A3) operate for all radio channels which are present in the combination. Thus, in the exemplary embodiment, radio line circuits 8, 11, and 14 and the associated receivers have been seized and connected through in multiple to the input of amplifier RC to attendant position 1.

In a similar manner the secondary winding of transformer 131 is now connected to the associated radio transmitter by make contacts 9 and 11 of operated relay 13A1 to thereby complete the transmit leads which extend from attendant position circuit 1 microphone 48 as hereinbefore described.

Referring now to FIGS. 1, 2, and 3, it will be noted that, as described in detail hereinbefore, the operation of nonlocking key DA–1A has caused the seizure of radio line circuits 8, 11, annd 14 which have their leads extended through respective crosspoints on switchframe 2 to connecting and isolating circuit 5. From connecting and isolating circuit 5 these leads are then extended to the attendant's headset receive and microphone where they are available to be simultaneously controlled by the attendant.

In a similar manner, the operation of nonlocking key DA–NA at attendant position N causes the seizure of radio line circuits 8, 13, and 16 via connecting and isolating circuit 7.

It is, of course, obvious that intermediate attendant positions may be similarly arranged so as to be associated with arbitrary combinations of radio lines under control of supervisory position circuit 3.

2.06. *Transmission lockout feature* (*FIGS. 1, 2, 3, 10, 11, 12, and 13*)

When it is desired to transmit on a combination of radio lines which have been seized at attendant position 1, the push-to-talk switch 110 is depressed at the position. The 10J relay operates from ground provided on lead J from key relay circuit 42 through contact 4 of jack 104, via plug 106 through the operated switch 110, through plug 105 to contact 3 of jack 103, operated make contact 5 of relay 10LS and normal break contact 11 of relay 10LT to the 10J relay winding.

Operated make contact 12 of relay 10J provides negative battery through ballast lamp 101 over the PO lead to connecting and isolating circuit 5 where it is multipled to correspondingly designated leads to other channels for the same combination. Thus, for radio line circuit 8 (typical), this battery potential is connected through diode 126 to the center tap on the secondary winding of repeat coil 118 where it is extended in simplex via the TT and TR leads through supervisory position circuit 3 and combiner switchframe 2 to the primary winding center tap of transformer 131 and finally through operated make contact 12 of relay 13A1, diode 137 and through the winding of relay 13C1 to ground. Relay 13C1 operates and via break contacts 1 and 3 opens the T2 and R2 leads which connect radio receiver 43 and the primary winding of transformer 131. Thus, the receive paths associated with all radio lines in the combination are disabled and the transmit paths associated with all radio lines in the combination are enabled and transmission may ensue. Restoration of the switch 110 to normal releases relay 10J in attendant position circuit 1 and causes the release of relay 13C1 in radio line circuit 8.

Referring now to FIGS. 1, 2, and 3, it is noted, as set forth in paragraph 2.04, that radio line circuit 8 is accessible to attendant position 1 via connecting and isolating circuit 5 and is also accessible to attendant position N via connecting and isolating circuit 7. Assuming that both positions have seized the combinations which include radio line circuit 8, it is obvious that simultaneous transmission by these positions is undesirable. Therefore, a transmission lockout feature is provided which is automatically effective under such circumstances as set forth in the following.

We shall assume that the attendant at attendant position 1 operates the push-to-talk switch 110 just before the corresponding switch is operated at attendant position N. As described above, when the 10J relay operates at attendant position 1, negative battery is transmitted in simplex over the TT and TR leads to the associated radio line circuits in the combination. Thus, negative battery is present on the TT and TR leads of radio line circuit 8 at their appearance at crosspoint contacts 0 and 1 of crosspoint 24–33 on switchframe 2. Therefore, since crosspoints 24–33 and 30–33 are closed in parallel, this battery is fed back via crosspoint contacts 0 and 1 of crosspoint 30–33 to repeat coil 118 of connecting and isolating circuit 7. This battery potential is extended through diode 127 to attendant position circuit N via lead LO. Battery on lead LO completes the operate path of relay 10LO which extends through operated make contact 10 of relay 10LS, released break contact 1 of relay 10J, and through the winding of relay 10LO to ground. The colsure of make contact 6 of relay 10LO extends negative battery from ballast lamp 101, through operated make contact 8 of relay 10D to operate relay 10LT in attendant position circuit N and relay 11TLO in connecting and isolating circuit 7. The operation of 10LT opens the operate path of the 10J relay via transfer contact 11 and completes the obvious operate path of relay 10TC by the same contact. Break contacts 1 and 2 of relay 11TLO open the TT and TR leads to repeat coil 118 for the radio channel associated with radio line circuit 8. Other contacts of the 11TLO relay open the TT and TR leads to the 118 repeat coils for other radio channels in the same combination.

The operation of relay 10TC via transfer contacts 4 and 5 open the TB and RB leads from amplifier RC and connect these leads to tone supply 50 which warns the attendant at position N that the lockout feature has been activated.

Thus, operation of switch 110 at attendant position N would be ineffective for the combination which includes radio line circuit 8 during the interval that attendant position 1 is transmitting on the combination which also includes this radio line circuit.

Release of switch 110 at attendant position 1 removes the battery potential from lead LO thereby releasing relays 10LO at attendant position circuit N, and also causing the relay 11TLO in connecting and isolating circuit 7 Therefore, at this point, switch 110 is enabled for attendant position circuit N and transmission may ensue on the combination at that position as set forth for attendant position 1 at the beginning of this subsection.

2.07. *Releasing of combination by supervisory position* (*FIGS. 4, 7, 8, and 9*)

The preceding subsections have described the manner in which combinations of radio lines are made accessible to an attendant position and also the manner in which these combinations are seized by the attendant position. However, release of the radio lines, which form a given combination, is under exclusive control of the supervisory position.

Assuming that the combination accessible to attendant position 1 by the operation of key DA–1A is to be released. Such release may be required since the combination has served its purpose or because the combination makeup is to be changed, i.e., one or more radio lines are to be replaced by one or more other radio lines.

At supervisory position circuit 3, key 1A is depressed and relay KC1A operates as set forth in paragraph 2.01 and FIG. 2. The holding paths for the hold magnets 8HM24A, 8HM25B and 8HM26C of FIG. 8 extend through their respective number 3 make contacts, through operated transfer contact 5 of relay 4KC1A, to ground on break contact 2 of the 4ER relay in FIG. 9. Operation of the ER key at this time operates relay 4ER which releases the operated hold magnets associated with the combination. At this point, any arbitrary combination of radio lines may be re-established, as hereinbefore described by the operation of position selecting key 1A.

2.08. *Inaccessibility of transmit path of selected radio lines within a combination* (*FIGS. 4, 7, 8, and 9*)

It may be desirable that an attendant position have access only to the receive path of certain radio lines within a combination. Where this situation prevails, the circuit action would proceed as described in paragraph 2.01, except that locking key RO would be operated in lieu of key RT. Thus, relay 4RO would operate by an obvious circuit which includes make contact 3 on the RO key.

Figure 8:
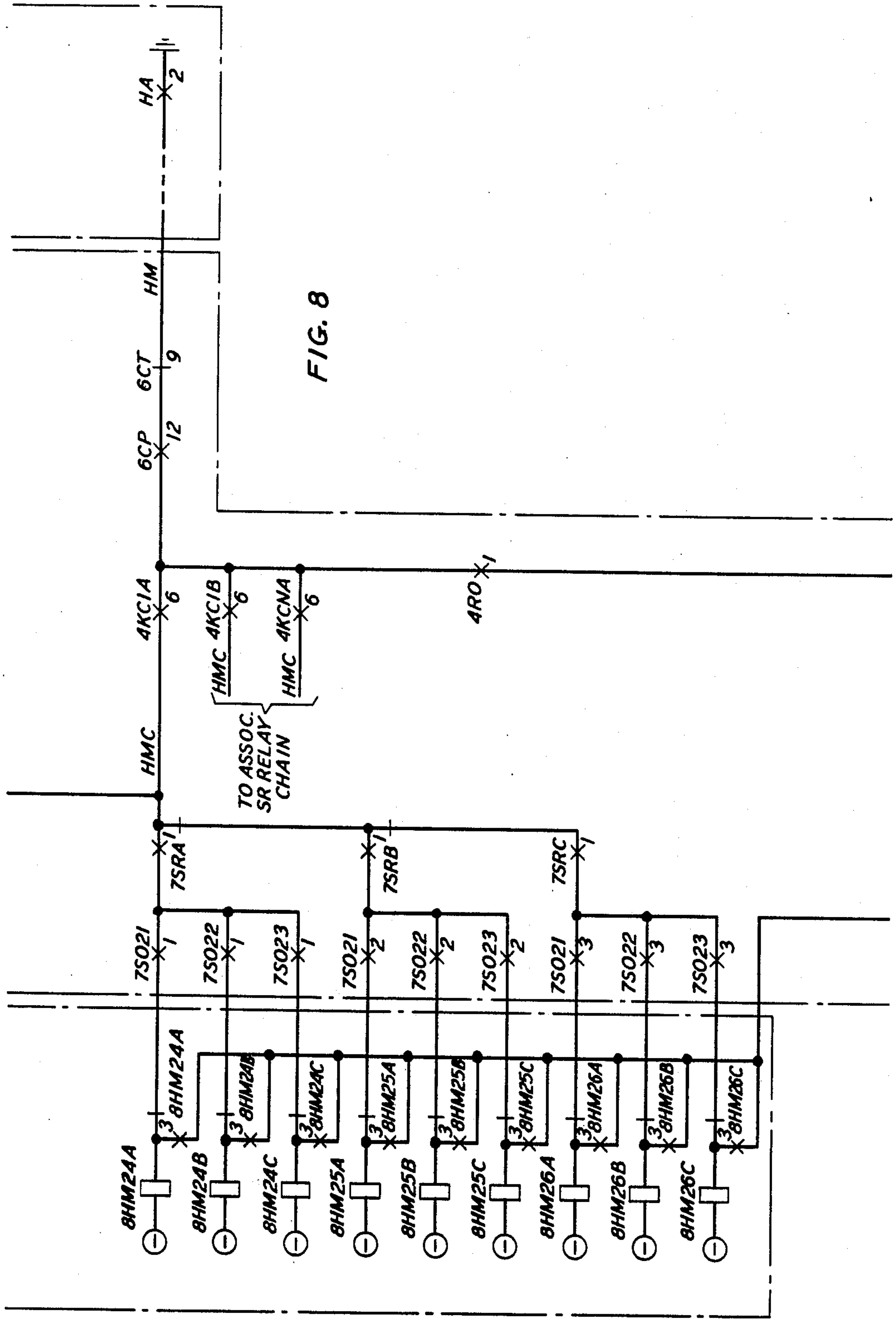
Figure 9:
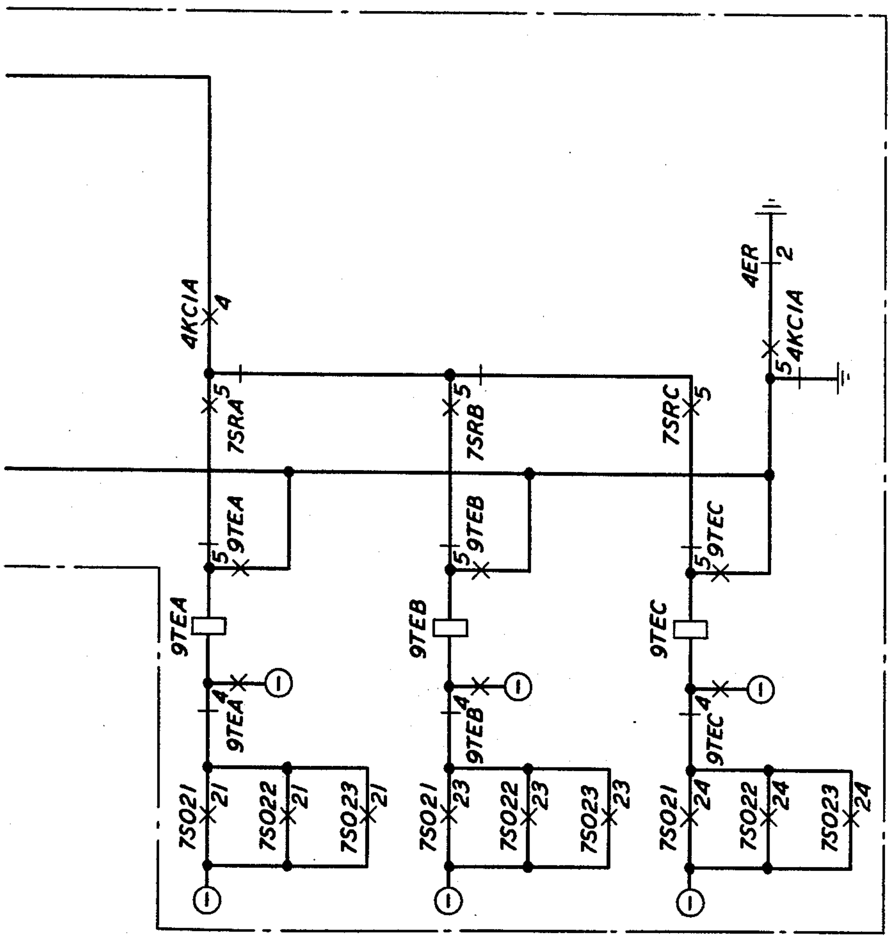
Figure 10:
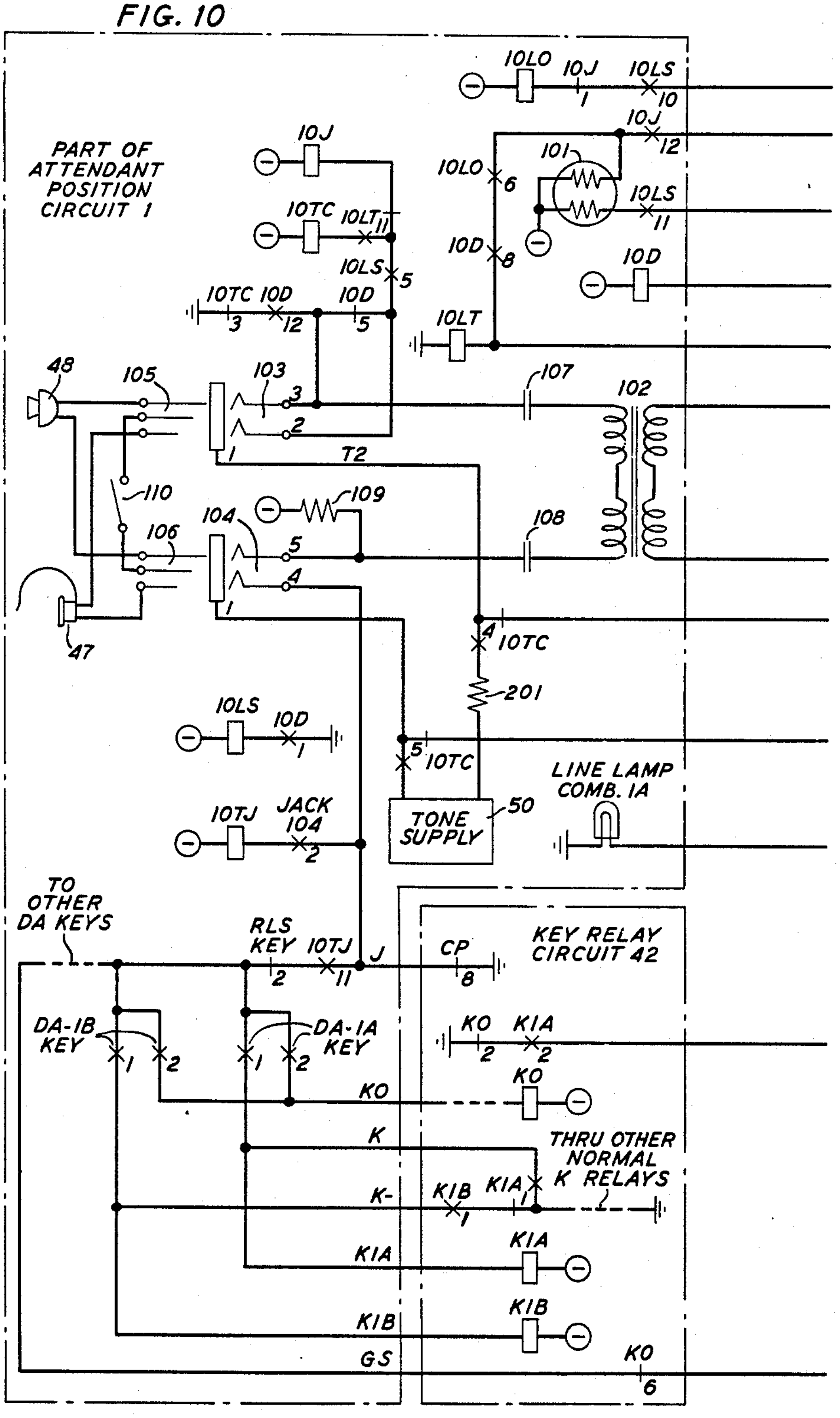
Figure 11:
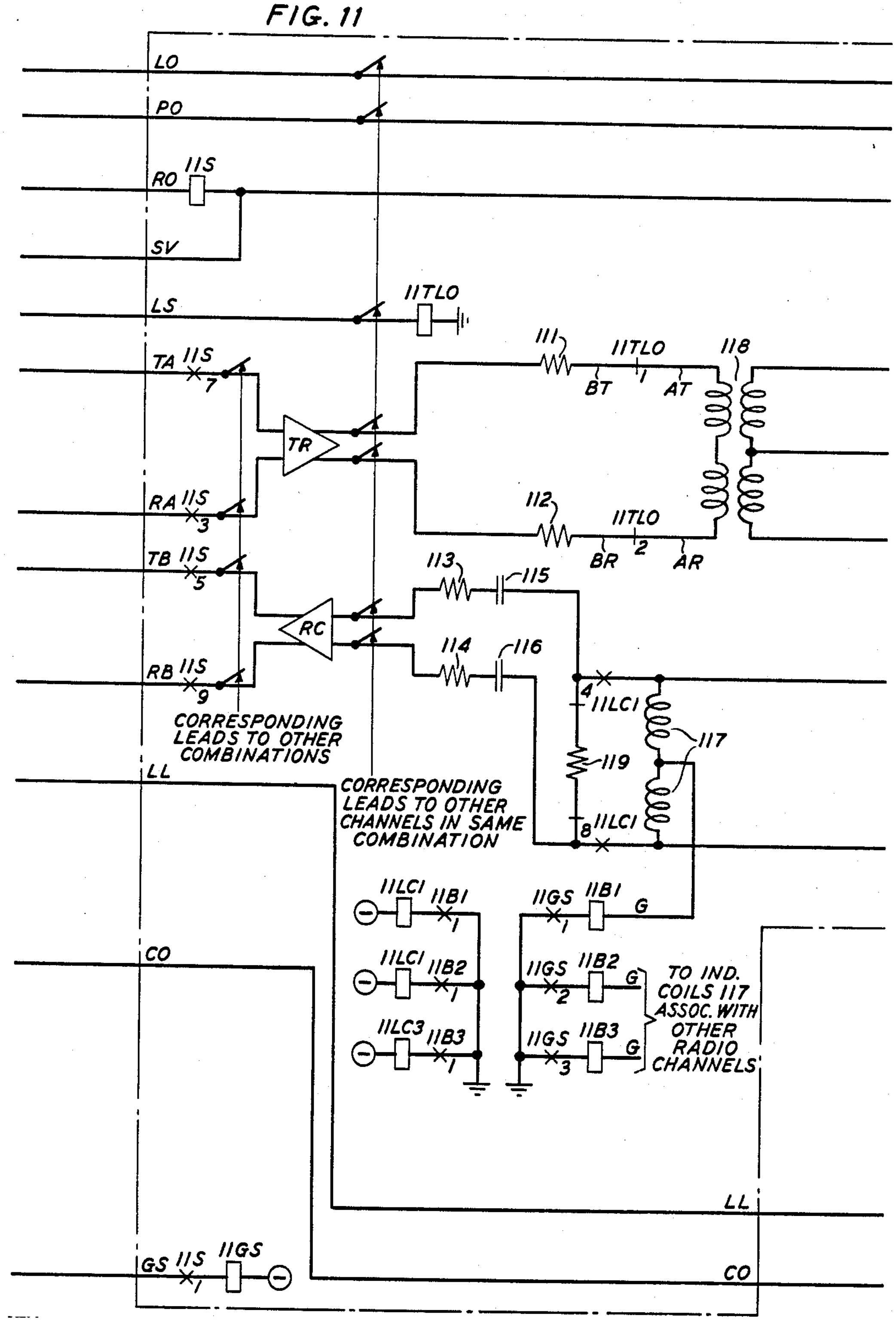

Referring now to FIGS. 8 and 9; circuit action would proceed exactly as described in paragraph 2.03 for the operation of 8HM24A. However, the operating ground for HM24A which is extended from controller 17 via the HM lead through 6CT contact 9 normal and 6CP contact 12 operated is also extended through 4RO contact 1 operated, 4KC1A contact 4 operated, 7SRA contact 5 operated, the winding of relay 9TEA and associated released contacts 4 and 5, to battery provided through operated make contact 21 of relay 7SO21. Relay 9TEA thereupon operates and locks in parallel with 8HM24A by an obvious circuit.

Figure 12:
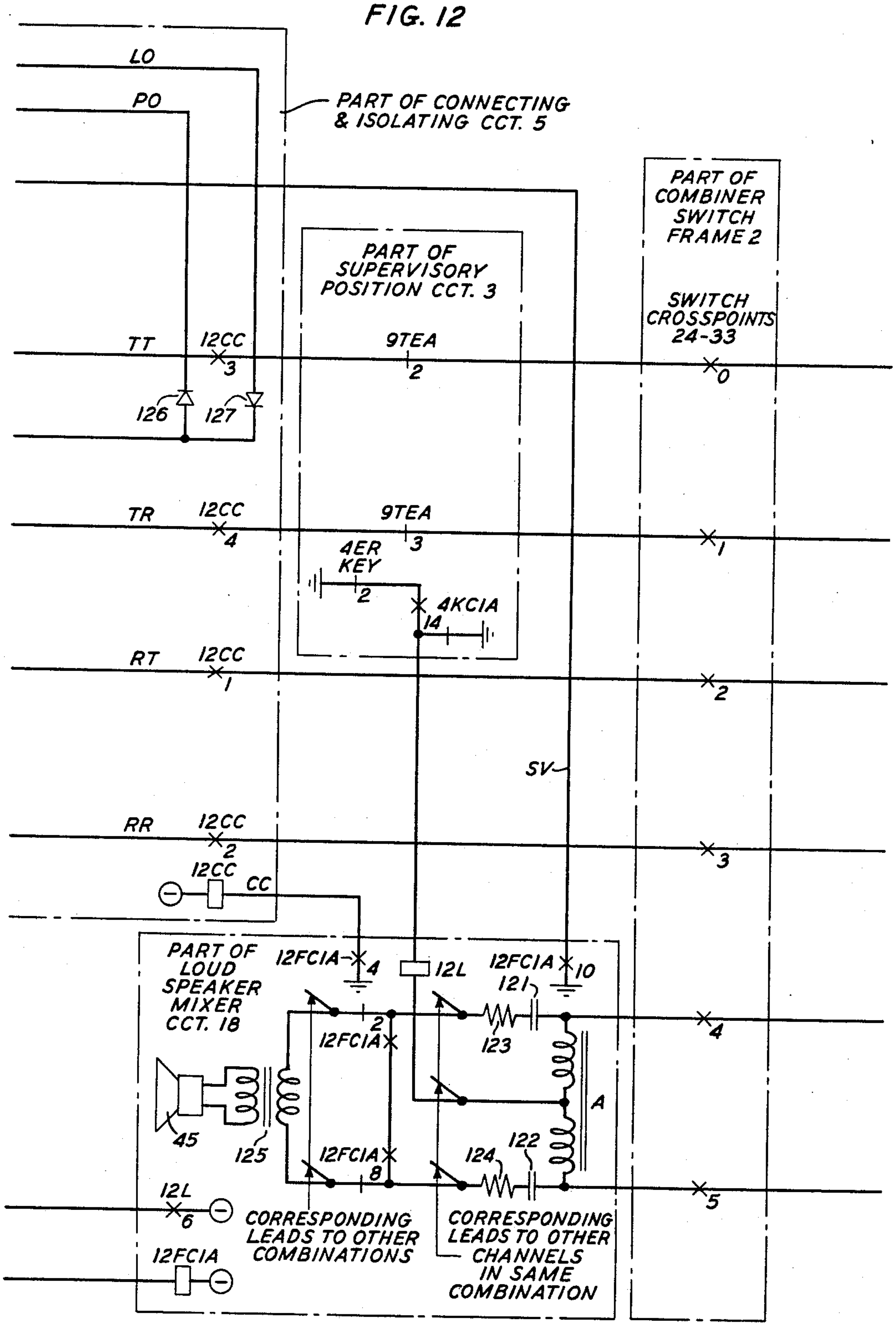
Figure 13:
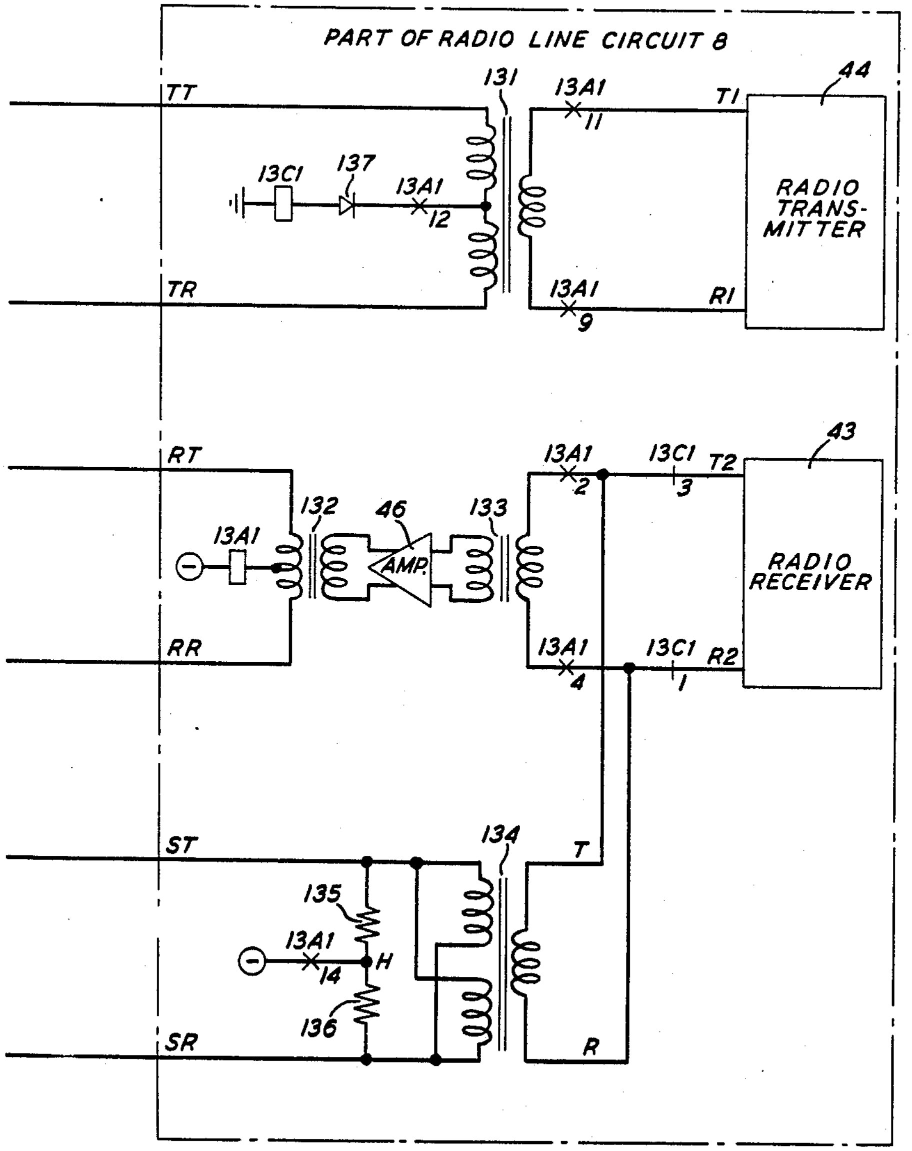

As shown in FIG. 12, operated break contacts 2 and 3 of relay 9TEA open the TT and TR leads to radio line circuit 8.

Thus, when the combination is seized, the transmit path for radio line circuit 8 would remain opened to prevent transmission on that particular channel in the combination.

2.09. *Adding radio lines to a combination after seizure of the combination by the attendant position (FIGS. 1 through 4, and 10 through 13)*

It is to be noted that no limitation exists as to the number of radio lines which may comprise a combination. Thus, for example, although the embodiment discloses equipment arrangements to provide three radio lines per combination, in practice many more may be provided. Further, it is not necessary that a combination initially comprise a full complement of radio lines, since additional radio lines may be subsequently added even after seizure of the combination by the attendant position, as set forth in the following.

Circuit action would proceed as described in paragraph 2.01 through 2.04 to the point where the second radio line is added to the combination.

At this point, the attendant position may seize the combination as set forth in paragraph 2.05. The supervisory position may then add a third radio line to the previously established combination as described in paragraph 2.01 through 2.03.

2.10. *Syllabic lamp feature (FIG. 14)*

As described hereinbefore, two or more distinct combinations of radio lines may be established which are accessible to a particular attendant position. As further described hereinbefore, the receive channels associated with each radio line in each combination are multipled to the position loudspeaker to permit monitoring by the attendant. Thus, for example, when attendant position 1 has two combinations available for seizure as set forth in paragraph 2.04, a total of six radio line circuits are simultaneously monitored at loudspeaker mixer circuit 18. Since the attendant must operate the proper DA key in order to seize a combination, a syllabic lamp feature is provided which advises the attendant of the combination which contains a radio line having an activated receive channel. A syllabic lamp corresponding to each combination is provided at attendant position 1 and each such lamp is lighted in response to the presence of an incoming audio signal on any radio line in the combination.

As shown in FIG. 14, the SR and ST leads from each radio line circuit are multipled through resistances 141 and 142 to the primary winding of transformer 143 in loudspeaker mixer circuit 18. The secondary winding of transformer 143 is connected to a conventional audio amplifying and detecting circuit 144. The signal from amplifying and detecting circuit 144 is used to drive a conventional reverse biased power amplifier 145, the output of which lights the syllabic lamp 1A in attendant position circuit 1 in response to an audio signal on the receive channels of any radio line in the associated combination.

It is of course obvious that syllabic lamps 1B, NA, and others, if provided, would be similarly arranged.

Therefore, during the course of monitoring several combinations, a specific combination is readily identifiable by the attendant utilizing the lighting of the associated syllabic lamp in conjunction with the audible sound from the loudspeaker.

2.11 *Summary*

While the equipments of this invention have been described with reference to a particular embodiment in an arrangement whereby a central supervisory position exercises control of the interconnection of subordinate attendant positions and a plurality of radio lines, it is to be understood that such an embodiment is intended to be illustrative of the principles of the invention and that numerous other arrangements may be devised by those skilled in the art without departing from the spirit and scope of the invention.

For example, the invention may be used at a centralized data processing center where a number of attendants respond to a plurality of incoming trunks from various data processing machines.

A further example would be where a large organization requires flexibility of conference connections either by wire or radio between a centralized point and various remote points.

A further example would be where a police or military headquarters is required to control groups of vehicles simultaneously by wire or radio.

Another example would be where an attendant position is additionally arranged in the same manner as the supervisory position so as to control the establishment of the radio combination accessible to that attendant position.

A still further example would be where each attendant position is arranged to control the establishment of combinations by the operation of a series of keys in lieu of pushbutton dialing.

What is claimed is:

1. In a switching system,
a plurality of attendant positions,
selectively operable connecting means at each of said positions,
a plurality of radio lines normally inaccessible to said positions, and
switching means for exclusively associating each of said positions with a different combination of said radio lines,
said switching means further comprising means responsive to the operation of said selectively operable connecting means at each of said positions for seizing the said combination exclusive thereto.

2. The combination set forth in claim 1 wherein said switching means further comprises means for causing the release of said combination exclusively associated with each of said positions.

3. The combination set forth in claim 1 wherein selected ones of said radio lines are common to selected ones of said combinations.

4. In a switching system,
a supervisory attendant position,
a plurality of subordinate attendant positions,
a manually operable key at each of said subordinate positions,
a plurality of radio lines normally inaccesible to said subordinate positions, and
switching means controlled by said supervisory position for exclusively associating a first group of said radio lines with one of said subordinate positions,
said switching means further comprising means responsive to the operation of said manually operable key at said one of said subordinate positions for simultaneously seizing all said radio lines comprising said first group of radio lines.

5. In a switching system,
a supervisory attendant position,
a plurality of subordinate attendant positions,
a manually operable key at each of said subordinate positions,
a plurality of radio lines each comprising transmit means and receive means normally inaccessible to said subordinate positions, switching means controlled by said supervisory position for exclusively associating each of said subordinate positions with a different combination of said radio lines, said switching means further comprising means responsive to the operation of said manually operable key at each of said subordinate positions for seizing the said combination exclusive thereto, common receive means located at each of said subordinate positions responsive to all of said receive means associated with each of said radio lines in said seized combination, and control means located at each of said subordinate positions operable to simultaneously control all of said transmit means associated with each of said radio lines in said seized combination.

6. In a switching system, a plurality of attendant positions, a manually operable key at each of said positions, a plurality of radio lines each comprising transmit means and receive means normally inaccessible to said positions, switching means for exclusively associating each of said positions with a different combination of said radio lines wherein selected ones of said radio lines are common to selected ones of said combination, said switching means further comprising means responsive to the operation of said manually operable key at each of said positions for seizing the said combination exclusive thereto, common receive means located at each of said positions comprising means simultaneously responsive to all of said receive means associated with each of said radio lines in said seized combination, and control means located at each of said positions comprising means operable to simultaneously control all of said transmit means associated with each of said radio lines in said seized combination, each of said control means further comprising lockout means operative at an active position to inhibit concurrent operation of said control means at other subordinate positions having combinations exclusive thereto wherein at least one of said selected radio lines is common to said combination associated with said active position.

7. In a switching system, a supervisory attendant position, a plurality of subordinate attendant positions, selectively operable connecting means at each of said subordinate positions, a plurality of radio lines normally inaccessible to said subordinate positions, said radio lines each comprising transmit means and receive means, switching means controlled by said supervisory position for exclusively associating each of said subordinate positions with a different combination of said radio lines, said switching means further comprising means responsive to a discrete signal from said supervisory position for inhibiting said transmit means associated with selected ones of said radio lines, said switching means further comprising means responsive to the operation of said selectively operable connecting means at each of said subordinate positions for seizing the said combination exclusive thereto, common receive means located at each of said subordinate positions simultaneously responsive to all of said receive means associated with each of said radio lines in said seized combination, and control means located at each of said subordinate positions operable to simultaneously control all of said noninhibited transmit means associated with each of said radio lines in said seized combination.

8. In a switching system, a supervisory attendant position, a plurality of subordinate attendant positions, a manually operable key at each of said subordinate positions, a plurality of radio lines normally inaccessible to said subordinate positions, switching means controlled by said supervisory position for exclusively associating a first group of said radio lines with one of said subordinate positions, said switching means further comprising means responsive to the operation of said manually operable key at said one of said subordinate positions for simultaneously seizing all radio lines comprising said first group of radio lines, and said switching means further comprising means controlled by said supervisory position for exclusively adding other radio lines to said first group of seized radio lines.

9. In a switching system, a supervisory attendant position, a plurality of subordinate attendant positions, a plurality of manually operable keys at each of said subordinate positions, a plurality of inactive radio lines normally inaccessible to said subordinate positions, switching means controlled by said supervisory position for exclusively associating each of said subordinate positions with a plurality of unique combinations of said radio lines, and visual indicating means associated with each of said combinations and located at each of said subordinate positions for indicating a combination comprising one or more radio lines which have become activated, said switching means further comprising means responsive to the operation of said manually operable keys at each of said subordinate positions for seizing the unique combinations exclusive thereto.

10. The combination set forth in claim 9 wherein said visual indicating means comprises means arranged to light a lamp at a syllabic rate in response to the presence of an incoming audio signal on any of said radio lines comprising a combination.

11. In a switching system, a supervisory attendant position, a plurality of subordinate attendant positions, selectively operable connecting means at each of said subordinate positions, a plurality of circuits normally inaccessible to said subordinate positions, switching means controlled by said supervisory position for exclusively associating each of said subordinate positions with a different combination of said circuits, and said switching means further comprising means responsive to the operation of said connecting means at each of said subordinate positions for seizing the said combination exclusive thereto.

12. In a switching system, a supervisory attendant position, a plurality of subordinate attendant positions, a plurality of manually operable keys at each of said subordinate positions, a plurality of radio lines normally inaccessible to said subordinate positions, and switching means responsive to signals from said supervisory position for establishing a plurality of combinations of said radio lines, said switching means further comprising means controlled by said supervisory position for causing each of said combinations to be accessible exclusively to a distinct one of said subordinate positions, said switching means further comprising means responsive to signals from said supervisory position for causing a first group of said radio lines to be common to several of said combinations, and said switching means further comprising means responsive to the operation of said manually operable keys for connecting said combinations of radio lines to said subordinate positions.

13. In a switching system, an attendant position, a plurality of radio lines comprising a plurality of combinations of said lines accessible to said position, and radio line control means located at said position and comprising visual indicating means operable to identify a combination in which a radio line has become activated, said radio line control means further comprising means selectively connectable at said position to any one of said combinations for controlling said combination.

14. In a switching system, a plurality of attendant positions, a plurality of radio lines selectively apportioned into radio line combinations each of which is connected to one of said positions, a first group of said positions each of which has a unique radio line combination exclusive thereto, a second group of said positions each of which has a radio line combination in which at least one of said radio lines is common to all said positions in said second group, and radio line control means at each of said positions comprising transmission control means selectively operable for activating said radio line combination connected thereto, said radio line control means further comprising means for enabling concurrent control of said transmission control means by each of said positions in said first group, said radio line control means further comprising means for inhibiting control of said transmission control means by all but one of said positions in said second group.

15. In a switching system, a plurality of attendant positions, a manually operable key at each of said positions, a plurality of radio lines normally inaccessible to said positions, said radio lines each comprising transmit means and receive means, switching means for exclusively associating each of said positions with a different combination of said radio lines, said switching means further comprising means for inhibiting said transmit means associated with selected ones of said radio lines, said switching means further comprising means responsive to the operation of said manually operable key at each of said positions for seizing the said combination exclusive thereto, common receive means located at each of said positions simultaneously responsive to all of said receive means associated with each of said radio lines in said seized combination, and control means located at each of said positions operable to simultaneously control all of said noninhibited transmit means associated with each of said radio lines in said seized combination.

16. In a switching system, a plurality of attendant positions, a manually operable key at each of said positions, a plurality of combinations of radio lines wherein each combination of radio lines is exclusively accessible to a preselected one of said positions, and switching means responsive to the operation of said manually operable key at each of said positions for seizing the said combination exclusive thereto.

17. In a switching system, a plurality of attendant positions, a manually operable key at each of said positions, a plurality of radio lines each comprising transmit means and receive means normally inaccessible to said positions, switching means for exclusively associating each of said positions with a different combination of said radio lines wherein selected ones of said radio lines are common to selected ones of said combinations, said switching means further comprising means responsive to the operation of said manually operable key at each of said positions for seizing the said combination exclusive thereto, common receive means located at each of said positions comprising means simultaneously responsive to all of said receive means associated with each of said radio lines in said seized combination, control means located at each of said positions comprising means operable to simultaneously control all of said transmit means associated with each of said radio lines in said seized combination, and each of said control means further comprising lockout means operative at an active position to inhibit concurrent operation of said control means at other positions having combinations exclusive thereto wherein at least one of said selected radio lines is common to said combination associated with said active position.

18. A switching system comprising a plurality of radio lines, a plurality of attendant positions, means for connecting distinct groups of said radio lines to different ones of said attendant positions, including transmit and receive means for each said group, means at said attendant positions for enabling said transmit and receive means, means for preventing simultaneous enablement of said transmit means for two of said groups of radio lines having at least one of said radio lines in common, and supervisory position means for determining the composition of said groups of radio lines.

19. A switching system in accordance with claim 18 wherein said connecting means further includes means independent of said transmit and receive means for providing speech signals from said groups of radio lines to said attendant positions and means at said attendant positions for identifying the group of radio lines from which said speech signals originate.

References Cited by the Examiner

UNITED STATES PATENTS

| | | | |
|---|---|---|---|
| 2,265,339 | 12/41 | Blanton et al. | 178—6.6 |
| 2,773,934 | 12/56 | Trousdale et al. | 179—18 |
| 2,922,847 | 1/60 | Downing | 179—23 |

ROBERT H. ROSE, *Primary Examiner.*

WALTER L. LYNDE, *Examiner.*